(12) United States Patent
Thomsen (10) Patent No.: US 10,900,868 B2
(45) Date of Patent: Jan. 26, 2021

(54) ULTRASONIC PROBE ADAPTER, ULTRASONIC TESTING METHOD AND ULTRASONIC TESTING SYSTEM

(71) Applicant: Vestas Wind Systems A/S, Aarhus N. (DK)

(72) Inventor: Ralf Thomsen, Dänischenhagen (DE)

(73) Assignee: Vestas Wind Systems A/S, Aarhus N. (DK)

( * ) Notice: Subject to any disclaimer, the term of this patent is extended or adjusted under 35 U.S.C. 154(b) by 336 days.

(21) Appl. No.: 16/080,807

(22) PCT Filed: Mar. 14, 2017

(86) PCT No.: PCT/EP2017/055939
§ 371 (c)(1),
(2) Date: Aug. 29, 2018

(87) PCT Pub. No.: WO2017/157907
PCT Pub. Date: Sep. 21, 2017

(65) Prior Publication Data
US 2019/0094109 A1 Mar. 28, 2019

(30) Foreign Application Priority Data

Mar. 14, 2016 (DE) .................... 20 2016 101 407 U
Mar. 14, 2016 (EP) ..................................... 16160212

(51) Int. Cl.
*G01M 13/028* (2019.01)
*G01M 13/021* (2019.01)

(52) U.S. Cl.
CPC ........ *G01M 13/028* (2013.01); *G01M 13/021* (2013.01)

(58) Field of Classification Search
CPC .. G01M 13/028; G01M 13/021; G01M 13/02; G01N 29/22; G01N 29/223; G01N 29/225; G01N 29/2468
(Continued)

(56) References Cited

U.S. PATENT DOCUMENTS

| 2,992,491 A | * | 7/1961 | Hofler | G01B 7/28 33/501.9 |
| 4,020,678 A | * | 5/1977 | Laue | G01M 7/00 73/579 |

(Continued)

FOREIGN PATENT DOCUMENTS

| CN | 103827960 A | 5/2014 |
| CN | 104994791 A | 10/2015 |

(Continued)

OTHER PUBLICATIONS

International Search Report and Written Opinion in PCT Application No. PCT/EP2017/055939, dated Jun. 14, 2017.

(Continued)

*Primary Examiner* — Lisa M Caputo
*Assistant Examiner* — Rose M Miller
(74) *Attorney, Agent, or Firm* — Wood Herron & Evans LLP (57) ABSTRACT

The present invention relates to an ultrasonic probe adapter for ultrasonic testing of toothed test specimens, an ultrasonic testing method and an ultrasonic testing system for detecting flaws in toothed test specimens. In particular, the present invention relates to an ultrasonic probe adapter (1, 1') for ultrasonic testing of toothed test specimens, in particular of externally toothed test specimens (100, 100', 101), comprising a probe side (10, 10') which preferably faces away from a test specimen (100, 100', 101) during ultrasonic testing, a test specimen side (20, 20') which preferably faces a test (Continued)

specimen (100, 100', 101) during ultrasonic testing, wherein the probe side (10, 0') and the test specimen side (20, 20') each have a longitudinal extension (L), a thickness (D) extending from the probe side (10, 10') to the test specimen side (20, 20'), and a width (B) extending orthogonally to the thickness (D) and orthogonally to the longitudinal extension of the probe side (10, 10') and/or to the longitudinal extension of the test specimen side (20, 20'), wherein a test toothing (21) is arranged on the test specimen side (20, 20').

12 Claims, 7 Drawing Sheets

(58) Field of Classification Search
USPC .......................................... 73/593, 617, 614
See application file for complete search history.

(56) References Cited

U.S. PATENT DOCUMENTS

| 2013/0312512 A1* | 11/2013 | Fels | G01B 5/202 |
| | | | 73/162 |
| 2019/0033168 A1* | 1/2019 | Brueckner | G01N 29/14 |

FOREIGN PATENT DOCUMENTS

| JP | H04350554 A | 12/1992 |
| JP | 2000326141 A | 11/2000 |

OTHER PUBLICATIONS

International Preliminary Report on Patentability in PCT Application No. PCT/EP2017/055939, dated Feb. 22, 2018.
China National Intellectual Property Administration, First Notification of Office Action in CN Application No. 201780017163.2, dated Nov. 6, 2019.

\* cited by examiner

ULTRASONIC PROBE ADAPTER, ULTRASONIC TESTING METHOD AND ULTRASONIC TESTING SYSTEM

The present invention relates to an ultrasonic probe adapter for ultrasonic testing of toothed test specimens, an ultrasonic testing method and an ultrasonic testing system for detecting flaws in toothed test specimens.

Ultrasonic testing belongs to the non-destructive testing methods, and ultrasonic testing comprises in particular the detection of flaws in and/or on a material by means of ultrasound. The use of ultrasonic testing as an acoustic method allows components to be tested also in a built-in or non-destroyed state. The principle of ultrasonic testing is based at least on the fact that the ultrasonic waves emitted by an ultrasonic device propagate at different speeds in different media.

Ultrasonic testing is used in particular for materials having a sound-conducting behavior. Ultrasonic testing is especially used for detecting inner and outer flaws, e.g. in welding seams, forgings and/or cast parts. The ultrasonic method is additionally used for detecting flaws located in the interior of a material or of a component. Such flaws may e.g. be inclusions, cracks, cavities, separation points and/or the existence of boundaries.

Ultrasonic testing processes use, among other components, a transmitting and/or receiving head, which transmits ultrasonic signals or ultrasonic pulses. The transmitting and/or receiving head transmits and/or receives e.g. longitudinal waves. When the sound wave from the ultrasonic probe enters the material, a wave transformation occurs. Testing is usually carried out with a transverse wave. The sound velocities for the two waveforms in a material are different. The longitudinal wave will generally always be faster.

In the case of this ultrasonic method, which is also referred to as sound reflection method or pulse echo method, the smallest flaw that can be displayed is greater than half the wavelength of the transmitted sound wave, which is dependent on the velocity of sound of the material and on the frequency of the ultrasonic probe. The frequency level, however, cannot be increased indefinitely, since the grain boundaries of the microstructure of a material may lead to scattering and absorption, whereby the penetration depth will be reduced. It follows that, in the case of materials having a coarse crystalline structure, high frequencies cannot be utilized, since the influence exerted by the individual grain boundaries on an ultrasonic signal would be too strong. Flaws cause a deviating reflection behavior of the sound waves, so that the reflection behavior can be utilized for flaw detection.

As regards ultrasonic testing of gears, various demands have to be met. One of these demands is that also very fine flaws, e.g. cracks in the interior of the material, can be detected. Moreover, it is a challenge to make the ultrasonic pulses enter the material of the toothed component with sufficient accuracy. This is mainly due to the non-smooth or non-planar gear surface, which is rather characterized by a sequence of individual teeth. The ultrasonic testing devices and ultrasonic methods for testing toothed components known in the prior art offer various advantages, but improved devices and methods are nevertheless desirable.

Ultrasonic testing of toothed components, in particular of gears having external teeth, with the devices known in the prior art has various disadvantages, which manifest themselves essentially in a less efficient detection of flaws. This can be explained especially by the fact that the teeth make it difficult to introduce the ultrasonic pulses homogeneously. In addition, testing of toothed components by means of the known devices and methods entails personnel- and time-intensive processes, which can only be automated to a limited extent.

Hence, it is an object of the present invention to provide an ultrasonic probe adapter, an ultrasonic testing method and an ultrasonic testing system, which reduce or eliminate one or more of the above-mentioned disadvantages. In particular, it is an object of the present invention to provide an ultrasonic probe adapter, an ultrasonic testing method and an ultrasonic testing system, which allow an improved and/or simplified detection of flaws in components, in particular in components of wind energy plants, especially of toothed components, such as blade bearings.

According to a first aspect of the present invention, this object is achieved by an ultrasonic probe adapter for ultrasonic testing of externally toothed test specimens, in particular of toothed components of wind energy plants, preferably of blade bearings of wind energy plants, comprising a probe side which preferably faces away from a test specimen during ultrasonic testing, a test specimen side which preferably faces a test specimen during ultrasonic testing, wherein the probe side and the test specimen side each have a longitudinal extension, a thickness extending from the probe side to the test specimen side, and a width extending orthogonally to the thickness and orthogonally to the longitudinal extension of the probe side and/or to the extension of the test specimen side, wherein a test toothing is arranged on the test specimen side.

The present invention is based on the finding that ultrasonic testing can be improved by using an ultrasonic probe adapter exhibiting on its test specimen side a negative form of the test specimen, i.e. of the component to be tested. In the present case, the ultrasonic probe adapter therefore exhibits partly or fully the negative form of a gear, so that the side facing the test specimen has teeth as well.

Since, during ultrasonic testing, an ultrasonic probe is normally used, one side of the ultrasonic probe adapter faces this ultrasonic probe during ultrasonic testing. This probe side of the ultrasonic probe adapter is especially configured such that it is suitable for arranging and/or moving an ultrasonic probe. Since the ultrasonic probe adapter is preferably arranged between an ultrasonic probe and a test specimen, the probe side faces the ultrasonic probe and faces thus away from the test specimen.

In contrast to the probe side, the test specimen side faces the test specimen. The test specimen is the component, in particular the externally toothed test specimen, to be tested by means of ultrasound, such test specimens being e.g. gears and/or toothed components of wind energy plants, preferably blade bearings of wind energy plants. Hence, the test specimen side is also configured such that it allows ultrasonic testing at a test specimen, in particular such that the test specimen side has a geometry that corresponds substantially to a negative form of the test specimen and/or a negative form of the surface of the test specimen.

The ultrasonic probe adapter additionally comprises the longitudinal extension of the test specimen side and the longitudinal extension of the probe side, which preferably and substantially have the same orientation. Since the test specimen side and/or the probe side may also have curved surfaces, the orientation of these longitudinal extensions may also be different partly or fully.

Furthermore, the ultrasonic probe adapter has a thickness, which extends preferably from the probe side to the test specimen side and which, additionally, is preferably oriented orthogonally to the longitudinal extension of the test specimen side and/or to the longitudinal extension of the probe side. The thickness need not be constant, but may vary along one of the longitudinal extensions and/or along a width. This width is orthogonal to the thickness and orthogonal to the longitudinal extension of the probe side and/or to the longitudinal extension of the test specimen side.

A base body, defined by the longitudinal extension of the probe side and the longitudinal extension of the test specimen side, the thickness and the width, may thus have rectangular cross-sections, but also curved cross-sections. Curved cross-sections are obtained especially in cases where the base body of the ultrasonic probe adapter is configured as a ring segment. According to a specially preferred embodiment, the ring-forming extension is the longitudinal extension of the probe side and/or the longitudinal extension of the test specimen side. Due to a varying thickness of the base body, the test specimen side and/or the probe side may be concave and/or convex. A concave and/or convex test specimen side and/or probe side may, however, also be formed in the case of a constant thickness, e.g. when the base body is configured as a ring segment, with the test specimen side and the probe side being spaced apart at a constant distance.

According to the present invention, the test toothing is arranged on the test specimen side. The test toothing is configured as one tooth, two teeth or a plurality of teeth. In particular, the term test toothing stands for a sequence of two or of a plurality of juxtaposed teeth, so that a row of teeth is formed. These teeth have the normal geometrical characteristics known from the prior art. According to a specially preferred embodiment, the toothing represents a negative form of test specimen teeth to be tested. Furthermore, the teeth of the test toothing are arranged on the test specimen side. Hence, the ultrasonic probe adapter is, fully or sectionwise, increased in thickness along the longitudinal extension of the test specimen side by the toothing, in particular by the height of the teeth in the direction of the thickness. The teeth may, as regards their respective largest tooth thickness, be arranged in direct contact with one another or spaced apart from one another.

The overall height of the ultrasonic probe adapter in the direction of the thickness is thus determined, on the one hand, by the thickness of the base body and, on the other hand, by a height, in particular an addendum, of the teeth arranged on the base body. Depending on the nature of the test specimen teeth to be tested, the test toothing on the ultrasonic probe adapter may e.g. comprise an involute toothing, a cycloidal toothing and/or a lantern gear toothing. Furthermore, the test toothing may preferably comprise straight teeth or helical teeth. Irrespectively of the nature of the toothing, a tooth of a toothing is configured at least by its addendum and its width.

The ultrasonic probe adapter can therefore be arranged on a test specimen, in particular an externally toothed test specimen. Making use of the preferably non-toothed probe side, an ultrasonic probe of an ultrasonic device can be arranged and/or moved on the probe side. Hence, ultrasonic signals transmitted by the ultrasonic probe will pass through the ultrasonic probe adapter and enter the test specimen. By arranging and/or moving the ultrasonic probe on a preferably non-toothed probe side, ultrasonic testing can be improved insofar as introduction of the ultrasonic signals into the test specimen will be optimized. In addition, the arrangement and/or movement of the ultrasonic probe can be simplified, since the ultrasonic probe must perform a substantially translational movement, preferably in the longitudinal direction of the ultrasonic probe adapter. This may e.g. have the effect that the ultrasonic testing method can be carried out with less error-proneness and/or easier and/or in an automated manner.

According to a preferred embodiment of the ultrasonic probe adapter, the ultrasonic probe adapter comprises plexiglass or is made of plexiglass. Plexiglass, which is also referred to as acrylic glass, is polymethyl methacrylate, PMMA for short. Plexiglass may be available as a transparent or as a non-transparent material. Plexiglass is suitable for the present case of use, e.g. because it is a material that can be shaped easily. Furthermore, plexiglass can be processed, e.g. machined, easily so that ultrasonic probe adapters that are made of plexiglass or that comprise plexiglass can be produced at a reasonable price.

According to a further preferred embodiment of the ultrasonic probe adapter, the test specimen side and the probe side are arranged in opposed relationship with each other.

According to a further, specially preferred embodiment of the ultrasonic probe adapter, the test specimen side is configured as a concave surface. A concave surface is characterized in that the surface is curved inwards. Hence, this surface can normally also be described by a radius. Such a concave test specimen side is advantageous insofar as it represents the negative form of a convex surface. Since an externally toothed gear normally has a circular cross-section, with the teeth arranged on the outer circumferential surface, and has thus normally a convex surface on the surface to be tested, the ultrasonic probe adapter having a concave test specimen side will be adapted to be advantageously used for ultrasonic testing of a test specimen, in particular of an externally toothed gear.

According to a further preferred embodiment of the ultrasonic probe adapter, the test specimen side is configured as a convex surface, i.e. an outwardly curved surface. An ultrasonic probe adapter having a convex test specimen side is particularly suitable for ultrasonic testing of an internal thread. An internal thread is especially arranged on an inner circumferential surface of a component.

According to a specially preferred embodiment of the ultrasonic probe adapter, said ultrasonic probe adapter is configured as a ring, so that the probe side forms the outer circumferential surface and the test specimen side forms the inner circumferential surface. This kind of ultrasonic probe adapter has therefore a ring-defining geometry, the circumferential surfaces being closed and thus continuous. Preferably, such ultrasonic probe adapters are used for testing gears, said gears having a smaller diameter, in particular a smaller root diameter, than the ultrasonic probe adapter which is configured as a ring. Hence, it will suffice to arrange the ultrasonic probe adapter only once on a test specimen and to subsequently move the outer circumferential surface or probe side of the ultrasonic probe adapter with an ultrasonic probe. According to a further variant of a preferred embodiment, the ultrasonic probe adapter is configured as a subring segment, which, other than the above explained embodiment, does not form a complete ring but only a ring segment, e.g. 270 degrees as a three-quarter segment or one 180 degrees as a semicircular segment. The circumferential surfaces are therefore sectionwise open and, consequently, not continuous.

According to a further, specially preferred embodiment of the ultrasonic probe adapter, the toothing is arranged substantially along the entire extension of the test specimen side. This embodiment has the effect that teeth are arranged along the test specimen side, possibly in spaced relationship with one another. However, also this mode of arrangement allows, in principle, that no teeth are arranged at the ends of the ultrasonic probe adapter or on areas adjoining these ends, i.e. on the ends between which the longitudinal dimension of the ultrasonic probe adapter extends.

According to a further, specially preferred embodiment of the ultrasonic probe adapter, the tooth thicknesses of teeth of the toothing extend substantially parallel to the longitudinal extension of the test specimen side. In the case of a curved test specimen side, the tooth thicknesses are oriented preferably parallel to a tangent on the test specimen side, said tangent being located at the point at which a tooth-flank-bisecting line meets the test specimen side.

According to a further embodiment variant of the ultrasonic probe adapter, the probe side is configured such that an ultrasonic probe can be arranged and/or moved. Hence, the probe side has preferably not provided thereon any toothing. In addition, the probe side is preferably substantially smooth so that an ultrasonic probe can be arranged and/or moved. A substantially smooth surface is in particular advantageous insofar as the ultrasonic pulses transmitted into the ultrasonic probe adapter will not be corrupted. Furthermore, the surface preferably has a predominantly homogeneous structure. This structure may e.g. have a certain roughness. In addition, the probe side according to this embodiment variant should preferably have no sharp-edged structures and/or notches.

According to a further, specially preferred embodiment of the ultrasonic probe adapter, the probe side is configured as a planar surface. Such a planar surface is especially characterised in that it does not exhibit any substantial curvature. A surface exhibiting substantially no curvature is mathematically characterized by an infinite radius. Hence, an ultrasonic probe can easily be moved with high accuracy and/or at high speed over such a planar surface of the probe side, so that the testing executed by the ultrasonic probe can be carried out with high accuracy and little effort.

According to another preferred embodiment of the ultrasonic probe adapter, the probe side is configured as a convex and/or concave surface. Convex, i.e. outwardly curved surfaces, or concave, i.e. inwardly curved surfaces, offer various advantages.

On the basis of the radius formed in the case of convex and concave surfaces, an ultrasonic probe can normally still move over the probe side with the necessary accuracy. In addition, convex and/or concave surfaces on the probe side can improve ultrasonic testing still further. This may especially be characterized by improved pulse propagation in the ultrasonic probe adapter and/or in the test specimen arranged below the ultrasonic probe adapter. Moreover, due to a convex and/or concave probe side, the thickness of the ultrasonic probe adapter along its longitudinal extension can remain constant, especially in the event that the test specimen side has a convex and/or concave surface.

According to a further aspect of the present invention, the object specified at the beginning is achieved by an ultrasonic testing method for detecting flaws for use with toothed test specimens, in particular externally toothed test specimens, in particular toothed components of wind energy plants, preferably blade bearings of wind energy plants, said method comprising the steps of providing an ultrasonic probe adapter, in particular an ultrasonic probe adapter according to the above mentioned embodiments, arranging the ultrasonic probe adapter on a test specimen, in particular on an external toothing of the test specimen, transmitting a sound pulse through the ultrasonic probe adapter into the test specimen and receiving an echo pulse for detecting a flaw in the material of the test specimen.

The step of arranging the ultrasonic probe adapter on a test specimen is carried out in particular such that the teeth of the ultrasonic probe adapter and the teeth of the external toothing of the test specimen will mesh. Preferably, the teeth of the ultrasonic probe adapter and the teeth of the test specimen enter into contact with one another. According to an alternative preferred embodiment, the ultrasonic probe adapter is spaced apart from the external toothing of the test specimen, so that there will be a free space between the test specimen and the ultrasonic probe adapter. Also in this case, the teeth of the test toothing are preferably arranged at least partially in the tooth gaps of the toothing of the test specimen. The resultant free space may then preferably be filled e.g. with a medium. This medium may especially be oil and/or water. The transmission of the sound pulse through the ultrasonic probe adapter into the test specimen is preferably effected by an ultrasonic probe arranged on the probe side of the ultrasonic probe adapter. Furthermore, the transmission of the sound pulse is preferably effected by a moving ultrasonic probe.

In addition, the ultrasonic probe adapter may preferably be arranged sectionwise. In this case, the ultrasonic probe adapter is configured e.g. as a ring segment, so that the ultrasonic probe adapter will only cover a portion of the test specimen. According to an alternative preferred embodiment, the ultrasonic probe adapter is configured as a ring, so that the ultrasonic probe adapter will fully enclose the test specimen. This enclosing should especially be understood such that the entire circumference of the test specimen is enclosed by the ultrasonic probe adapter.

The reception of the echo pulse, in particular for the purpose of detecting a flaw in and/or on the material of the test specimen, takes place e.g. either by the above-mentioned ultrasonic probe or by a separate echo pulse receiving head comprising e.g. a sound sensor. The reception of the echo pulse serves especially the purpose of flaw detection, so that a suitable evaluation of this echo pulse subsequent to the reception is preferred. In particular, it is preferred that this evaluation reveals a flaw in the material and additionally identifies preferably where this flaw is located in the material.

According to a preferred embodiment of the ultrasonic testing method, the test specimen is an element of a wind energy plant, in particular a blade bearing with external teeth of a wind energy plant. The use of this method and/or of the ultrasonic probe adapter in the field of wind energy plants is specially preferred. Due to the size of wind energy plants and of the individual components thereof, it requires much effort to dismount such wind energy plants or components. The method according to the present invention and the ultrasonic probe adapter according to the present invention allow ultrasonic testing to be carried out at the wind energy plant on site.

This kind of testing allows not only to profit from the advantages of the above described ultrasonic testing but also to save costs, at least insofar as the wind energy plant need not be dismounted or that it will suffice to dismount it only partially. A prerequisite for the use of this method in the case of wind energy plants is that the wind energy plant stands substantially still.

According to another specially preferred embodiment of the ultrasonic testing method, a lubricant, in particular an oil, is arranged between the ultrasonic probe adapter and the test specimen. The above described ultrasonic testing method may especially be used for detecting cracks in the area of holes provided in the test specimen. Since cracks in materials will form especially at indentations, such as holes, the method is particularly suitable for this purpose.

According to a further, specially preferred embodiment of the ultrasonic testing method, the latter comprises the additional steps of moving a toothed portion of a wind energy plant component away from its operating region, preferably away from the operating region of a pitch motor, and testing the operating region with the steps according to at least one of the preceding embodiment variants of the ultrasonic testing method. Pitch motors serve to rotate a wind energy plant blade about a longitudinal axis. Since this rotation normally takes place in only a small angular range and not in the form of a full 360 degree rotation, a toothing, which is provided on the wind energy plant blade and/or blade bearing and which serves to rotate the wind energy plant blade, will be subjected to stress and strain, in particular locally. This is the local area on which a pitch motor element corresponding to the toothing normally moves, the pitch motor being used for moving the wind energy plant blade. When the wind energy plant blade rotates such that it is not within its normal operating region, this will have the effect that the toothing, on which the pitch motor moves during operation, will be accessible especially for ultrasonic testing. Hence, especially this local region can be tested by means of the ultrasonic testing method according to one of the above described embodiments.

According to a further aspect of the present invention, the object specified at the beginning is achieved by an ultrasonic testing system for detecting flaws in toothed test specimens, in particular in externally toothed test specimens, said ultrasonic testing system comprising an ultrasonic testing device configured for transmitting and/or receiving a sound pulse, and an ultrasonic probe adapter according to one of the above mentioned embodiments. Such an ultrasonic testing system is advantageous insofar as it combines the above mentioned advantages of the ultrasonic testing method with the advantages of the ultrasonic probe adapter, which have been mentioned hereinbefore as well.

As regards further advantages, embodiment variants and embodiment details of these additional aspects and their possible further developments, reference is also made to the above description of the respective features and further developments of the ultrasonic probe adapter.

A preferred embodiment of the present invention is exemplarily described on the basis of the attached figures, in which.

Figure 1:
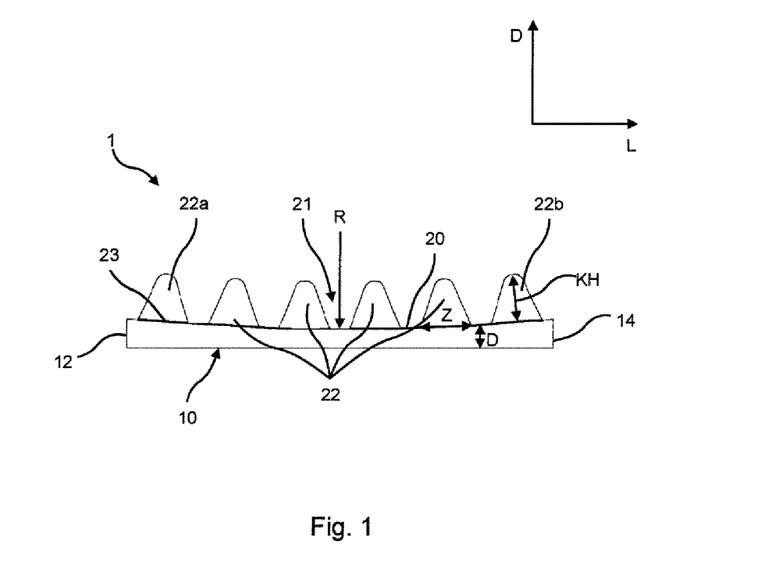
FIG. 1 shows a schematic side view of an exemplary embodiment of an ultrasonic probe adapter according to the present invention.

FIG. 1 shows a schematic side view of an exemplary embodiment of an ultrasonic probe adapter 1 according to the present invention. The ultrasonic probe adapter 1 comprises a base body and a test toothing 21. The base body is defined by a longitudinal extension L, a thickness D and a width B (which is here not shown). The longitudinal extension L of the ultrasonic probe adapter 1 extends from a first end 12 to a second end 14. Orthogonally to the longitudinal extension L, the ultrasonic probe adapter 1 additionally has the thickness D. The thickness D extends from a probe side 10 up to a root diameter 23 of the test toothing 21. The dimension of the thickness D varies along the longitudinal extension L, so that the concave test specimen side 20 is defined by the width B, which is oriented orthogonally to the thickness D and orthogonally to the longitudinal extension L, and the root diameter 23, which extends substantially in the longitudinal direction.

On the test specimen side 20, the test toothing 21 is arranged. The test toothing 21 comprises the individual teeth 22, 22a, 22b, which are arranged side-by-side along the root diameter 23 at equal distances from one another. The tooth thickness Z extends here substantially parallel to the root diameter 23 on the test specimen side 20. In addition, an addendum KH of the teeth 22, 22a, 22b, which extends from the respective tooth root to the tooth crest, has a constant dimension.

The probe side 10 extends on the opposite side of the test specimen side 20. The probe side 10 extends from the first end 12 to the second end 14 of the ultrasonic probe adapter 1. The probe side 10 has a planar surface so that, other than the test specimen side 20, the probe side 10 does not have any radius R.

Figure 2:
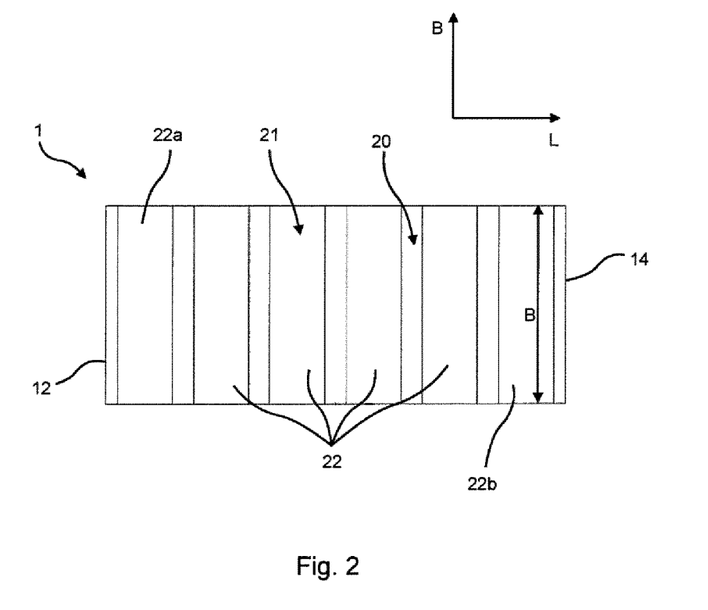
FIG. 2 shows a schematic top view of the ultrasonic probe adapter according to FIG. 1.

FIG. 2 shows a schematic top view of the ultrasonic probe adapter 1 according to FIG. 1. The width B extends, according to the present invention, orthogonally to the longitudinal extension L and orthogonally to the thickness D. The teeth 22, 22a, 22b extend across the whole width B of the ultrasonic probe adapter. In addition, FIG. 2 shows that the first end 12 is adjoined by an area which, in turn, is adjoined by the first tooth 21a. Furthermore, also the second end 14 is adjoined by an area, which is adjoined by the last tooth 21b.

Figure 3:
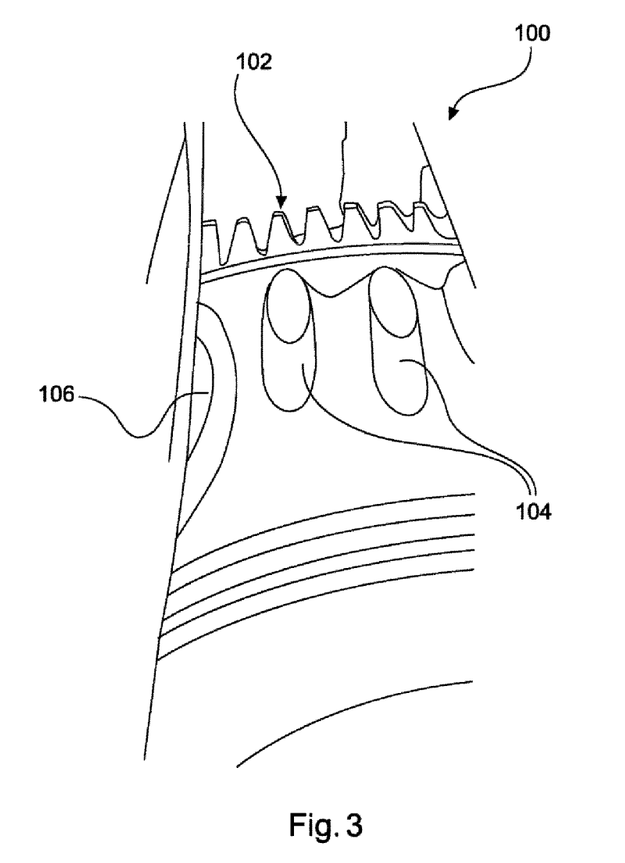
FIG. 3 shows an example of use for an ultrasonic probe adapter according to the present invention.

FIG. 3 shows an example of use for an ultrasonic probe adapter 1 according to the present invention. The example of use shows a blade bearing 100 having external teeth 102 as well as stud bolts 104 arranged in mounting holes 106.

Figure 4:
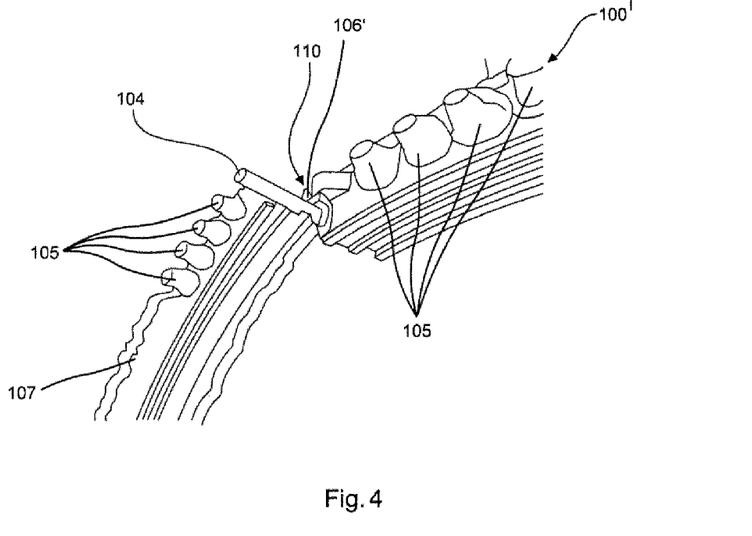
FIG. 4 shows a case of damage in the field of use of an ultrasonic probe adapter according to the present invention.

FIG. 4 additionally shows a case of damage in the field of use of an ultrasonic probe adapter 1 according to the present invention. The case of damage shows a blade bearing 100' that broke apart at a site of damage 110. The site of damage 110 extends through a mounting hole 106' in the direction of a direction that is orthogonal to the longitudinal extension of the mounting hole 106'. One half of the broken-apart mounting hole 106' has additionally arranged thereon one of the stud bolts 104 which were previously arranged in the mounting hole 106'. Due to the damage, the blade bearing 100' dropped from the tower of a wind energy plant onto the ground near the wind energy plant. Parts of the blade bearing 100' have therefore been covered with mud 107.

The mud 107 is especially soil soaked with water, e.g. with rain. In particular, some stud bolts 105 are covered by said mud 107 or the mud is located at some points of these muddy stud bolts 105.

Figure 5:
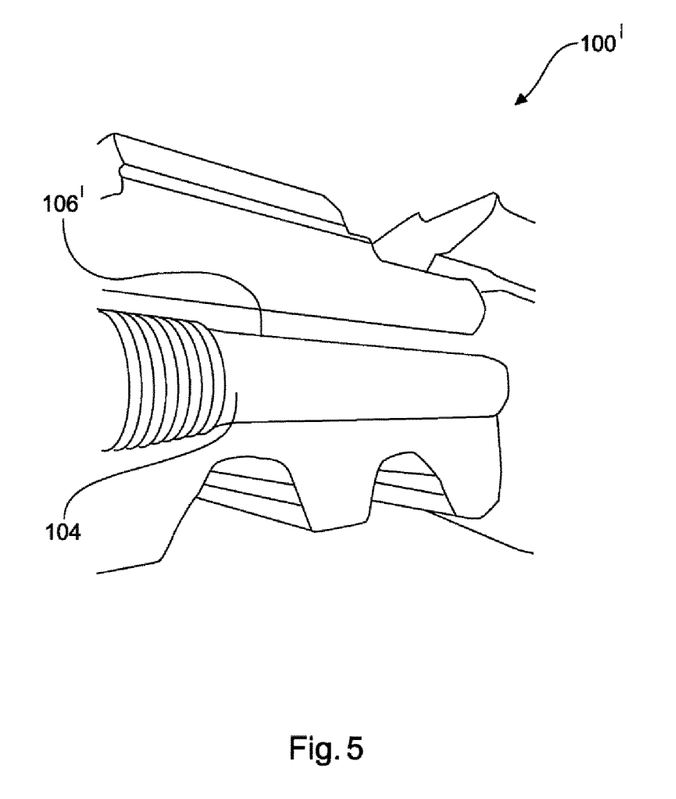
FIG. 5 shows a further view of the case of damage according to FIG. 4.

FIG. 5 shows a further view of the case of damage according to FIG. 4. FIG. 5 shows the half of the broken-apart mounting hole 106' having, also in this broken-apart condition, arranged the stud bolt 104 therein.

Figure 6:
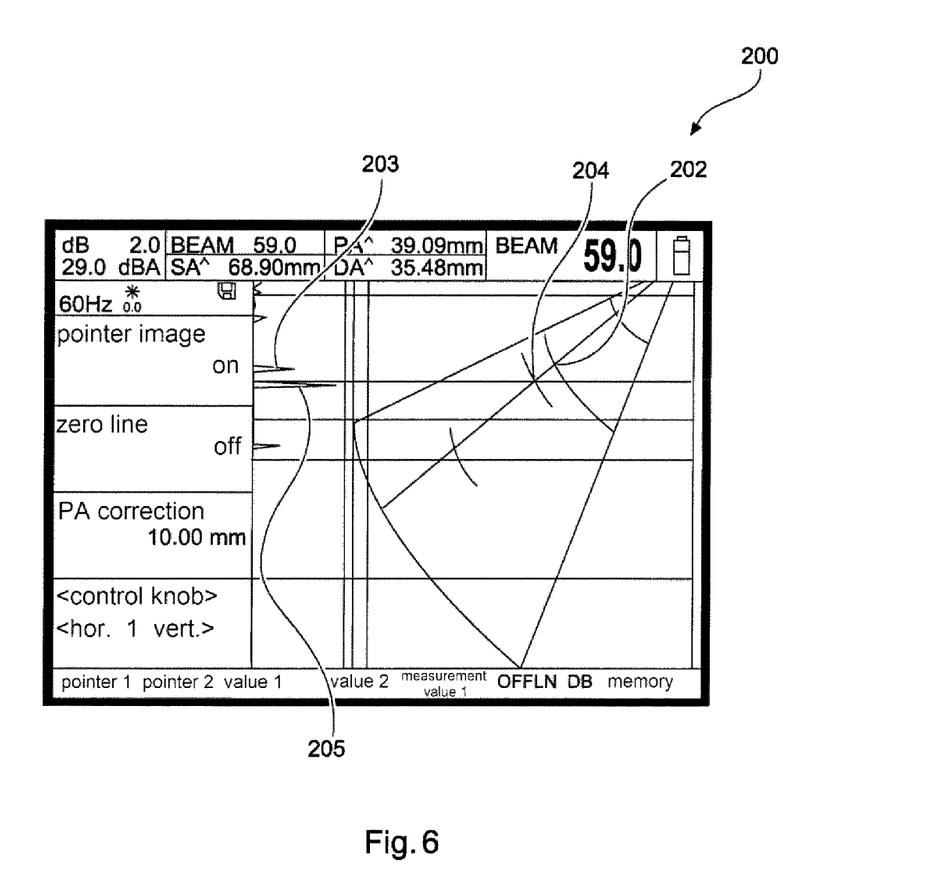
FIG. 6 shows a representation of an ultrasonic testing result obtained by means of an ultrasonic probe adapter according to the present invention.

FIG. 6 shows a graphic representation of an ultrasonic test result obtained by means of an ultrasonic probe adapter 1 according to the present invention. The test result representation 200 shows the result of ultrasonic testing, in particular of ultrasonic testing carried out by means of the ultrasonic probe adapter 1 according to the present invention on a blade bearing 100, 100' having one or a plurality of mounting holes 106, 106'. Hence, the test result representation 200 comprises hole detection 202 of the mounting hole 106, 106' with a small amplitude 203. Furthermore, the test result representation 200 also comprises crack detection 204 with a large amplitude 205.

Figure 7:
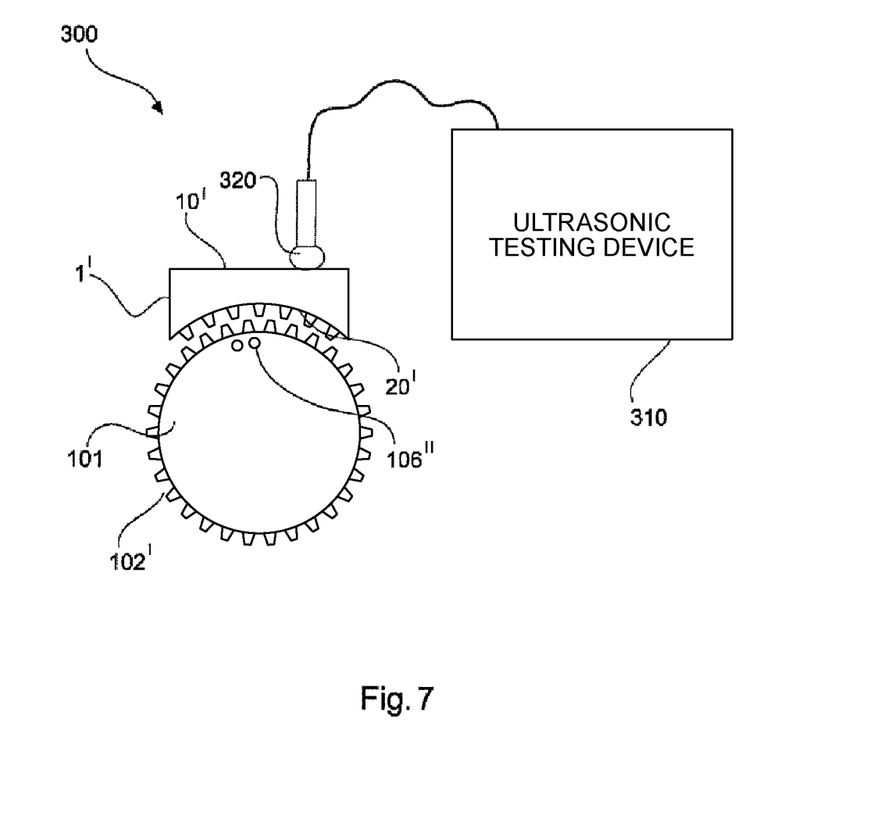
FIG. 7 shows a schematic view of an ultrasonic testing system.

FIG. 7 shows a schematic view of an ultrasonic testing system 300 comprising an ultrasonic testing device 310 and an ultrasonic probe 320. In addition, the ultrasonic probe 320 is arranged on the horizontal and substantially planar probe side 10' of the ultrasonic probe adapter 1'. Furthermore, the ultrasonic probe adapter 1' has its test specimen side 20' arranged on external teeth 102' of the test specimen 101. Due to this arrangement, ultrasonic pulses controlled by the ultrasonic probe 320 can be transmitted into the test specimen through the ultrasonic probe 320 and through the ultrasonic probe adapter 1', so that material defects and/or damage, in particular in the area of mounting holes 106", can be detected.

It follows that the ultrasonic probe adapter 1 shown in FIGS. 1 and 2 offers the advantage of crack detection 204 in toothed components 100. To this end, the ultrasonic probe adapter 1 is arranged such that its test specimen side 20 is located on and/or in and/or at the external teeth 102, 102' of the test specimen. The ultrasonic probe adapter 1 is especially arranged such that its teeth 22, 22a, 22b are disposed in the tooth gaps of the external teeth 102, 102' of the blade bearing 100, 100' and/or of the test specimen 101. On the one hand, the mode of arrangement may be such that the teeth 22, 22a, 22b of the ultrasonic probe adapter 1 as well as the teeth of the external teeth 102, 102' of the test specimen 101 and/or of the blade bearing 100, 100' are in direct contact with one another. On the other hand, it is possible to arrange the ultrasonic probe adapter 1 in spaced relationship with the test specimen 101 and/or the blade bearing 100, 100', in particular the external teeth 102, 102'. This space may be bridged e.g. with oil.

When the ultrasonic probe adapter 1 has been arranged on the test specimen 101 and/or the blade bearing 100, 100' as described above, an ultrasonic probe 320 moves over the probe side 10 of the ultrasonic probe adapter 1. While the ultrasonic probe 320 moves in this way, it preferably transmits ultrasonic pulses. The evaluation of the echo, in particular of the amplitudes 203, 205 of the echo, allows, among other things, a detection of sites of damage in the interior of a component. By detecting a site of damage, which is located in the interior of a component, the destruction of this component can be predicted and/or avoided. Through this prediction also damage to components, which correspond to the damaged component, can be avoided.

REFERENCE NUMERALS

1, 1' ultrasonic probe adapter
10, 10' probe side
12 first end
14 second end
20, 20' test specimen side
21 test toothing
22 tooth
22a first tooth
22b last tooth
23 root diameter
100, 100' blade bearing
101 test specimen
102, 102' external teeth
104 stud bolt
105 muddy stud bolt
106, 106', 106" mounting hole
107 mud
110 site of damage
200 test result representation
202 hole detection
203 small amplitude
204 crack detection
205 large amplitude
300 ultrasonic testing system
310 ultrasonic testing device
320 ultrasonic probe
B width
D thickness
KH addendum
L longitudinal extension
R radius test specimen side
Z tooth thickness

The invention claimed is:

1. An ultrasonic probe adapter for ultrasonic testing of externally toothed test specimens, comprising
 a probe side which faces away from a test specimen during ultrasonic testing,
 a test specimen side which faces a test specimen during ultrasonic testing,
 wherein the probe side and the test specimen side each have a longitudinal extension,
 a thickness extending from the probe side to the test specimen side,
 a width extending orthogonally to the thickness and orthogonally to the longitudinal extension of the probe side and/or to the longitudinal extension of the test specimen side,
 wherein a test toothing is arranged on the test specimen side, wherein said ultrasonic probe adapter is configured as a ring or ring segment, so that the probe side forms the outer circumferential surface and the test specimen side forms the inner circumferential surface.

2. The ultrasonic probe adapter according to claim 1, wherein the ultrasonic probe adapter comprises plexiglass or is made of plexiglass.

3. The ultrasonic probe adapter according to claim 1, wherein the test specimen side is arranged in opposed relationship with the probe side.

4. The ultrasonic probe adapter according to claim 1, wherein the toothing is arranged along the entire extension of the test specimen side.

5. The ultrasonic probe adapter according to claim 1, wherein tooth thicknesses of teeth of said toothing extend parallel to the longitudinal extension of the test specimen side.

6. The ultrasonic probe adapter according to claim 1, wherein the probe side is configured such that an ultrasonic probe can be arranged and/or moved.

7. The ultrasonic probe adapter according to claim 1, wherein the probe side is configured as a planar surface.

8. An ultrasonic testing method for externally toothed test specimens, comprising the following steps:
 providing an ultrasonic probe adapter according to claim 1,
 arranging the ultrasonic probe adapter on a test specimen,
 transmitting a sound pulse through the ultrasonic probe adapter into the test specimen,
 receiving an echo pulse.

9. The ultrasonic testing method according to claim 8, wherein the test specimen includes a blade bearing with external teeth of a wind energy plant.

10. The ultrasonic testing method according to claim 8, wherein a lubricant is arranged between the ultrasonic probe adapter and the test specimen.

11. The ultrasonic testing method according to claim 8, comprising
   moving a toothed portion of a wind energy plant component away from its operating region prior to the arranging and transmitting steps.

12. An ultrasonic testing system for detecting flaws in externally toothed test specimens, comprising
   an ultrasonic testing device with an ultrasonic probe configured for transmitting and/or receiving a sound pulse, and
   an ultrasonic probe adapter according to claim 1.

* * * * *